June 21, 1966  L. S. BIALKOWSKI  3,257,119
FLUID PRESSURE SEAL ASSEMBLY IN WHICH INCREASING
PRESSURE DECREASES BREAK-OUT FORCE
Original Filed Sept. 13, 1962  3 Sheets-Sheet 2
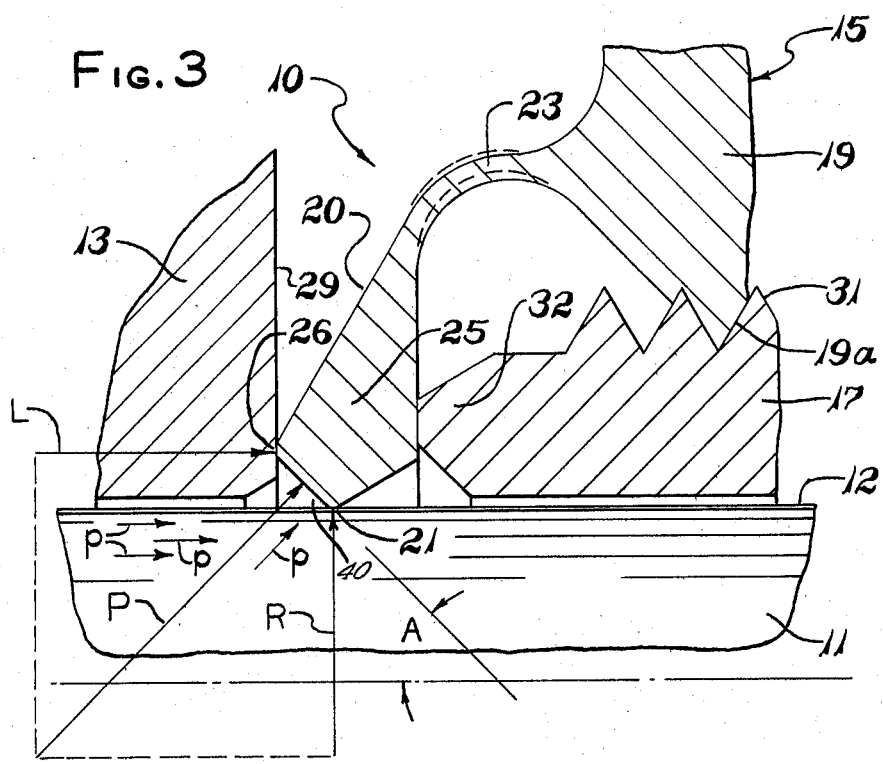
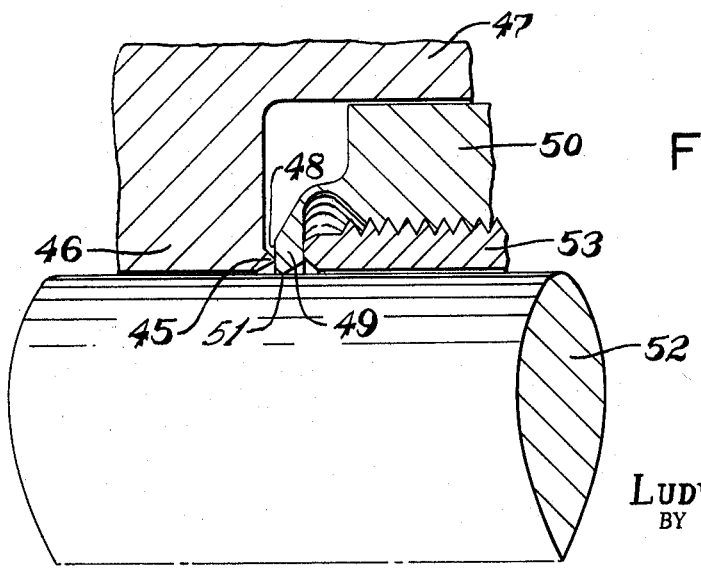
INVENTOR.
LUDWIK S. BIALKOWSKI
BY John D. Haney
ATTY.

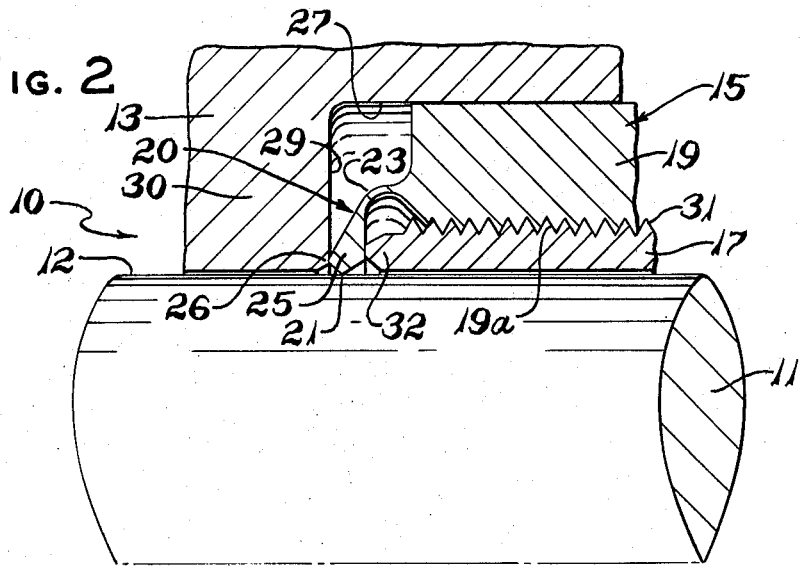
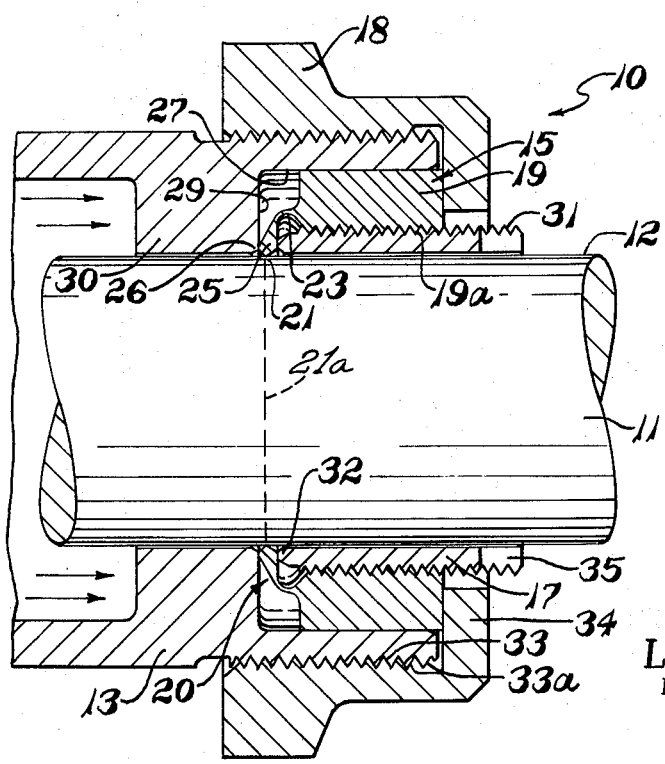

INVENTOR.
LUDWIK S. BIALKOWSKI
BY John D Haney
ATTY.

United States Patent Office 3,257,119
Patented June 21, 1966

3,257,119
FLUID PRESSURE SEAL ASSEMBLY IN WHICH INCREASING PRESSURE DECREASES BREAK-OUT FORCE
Ludwik S. Bialkowski, Troy, Ohio, assignor to The B. F. Goodrich Company, New York, N.Y., a corporation of New York
Continuation of application Ser. No. 223,561, Sept. 13, 1962. This application Jan. 21, 1965, Ser. No. 426,787
15 Claims. (Cl. 277—110)

This application is a continuation of my pending U.S. patent application Serial No. 223,561, filed September 13, 1962.

This invention relates to fluid pressure seals for hydraulic equipment. The seals of this invention are especially useful between relatively reciprocating members and under service conditions involving very high temperatures (e.g. 200–800 degrees Fahrenheit or more), and extreme variations in operating temperatures (e.g. −65 to +500 degrees Fahrenheit). They also have utility as rotary or as static seals, and in general they embody design principles disclosed and claimed in my copending patent application U.S. Serial 424,678 filed January 11, 1965. The latter application is a continuation case consolidating the subject matter of my now abandoned patent application U.S. Serial 223,562, filed September 13, 1962 and my now abandoned patent application Serial 223,565, filed September 13, 1962. The subject matter of abandoned application Serial 223,562 was originally presented in my abandoned application Serial 10,492, filed February 23, 1960. The components of these seals are entirely of metal.

Fluid pressure seals necessarily impose a frictional drag on a dynamic member which they engage. One measure of the tightness or drag of a seal is the so-called "break-out" force of the engaged dynamic member which is the minimum force required to move the dynamic member relative to its seal. Prior to this invention mechanical pressure seals of which I am aware and which are suitable for high pressure service tend to tighten and increase their dynamic drag as the system pressure increases. That is to say, the break-out force increases more or less linearly with the system pressure acting on the seal.

An extraordinary property of the seals of this invention is that the break-out force of a dynamic member engaged therewith *decreases* as the system pressure increases. In other words, with these seals break-out force can be inversely proportional to the system pressure. To illustrate this point by numbers, a seal assembly according to this invention may be tightened on a reciprocative rod to provide a break-out force of about 100 pounds when the system pressure acting on the seal is 0 pounds per square inch. When the system pressure is then increased to say 3000 pounds per square inch, the break-out force decreases to about 50 pounds, yet the seal will continue to function effectively to restrain fluid leakage.

This property of the seals is especially valuable in hydraulic apparatus of the type used in aircraft where a high break-out force is acceptable and even desirable at low pressures. Because of the smaller break-out force at higher operating pressures, much less work must be expended to move the dynamic member than with previously known seals. With the design principles described herein, seals embodying this invention may be designed very accurately to provide any desired break-out force-pressure characteristics for a given hydraulic mechanism.

The seals of this invention are of the class described and claimed in my aforesaid pending United States patent application Serial No. 424,678. In this respect these seals include an annular metallic sealing ring having a stiff annular body with a stiff annular sealing diaphragm integral therewith. The diaphragm is joined to the annular body along a thin resiliently deflectable zone of the diaphragm, and the diaphragm terminates in an annular margin on which there is a very narrow annular circumferentially continuous sealing edge. This sealing edge is urged into sealing engagement with an adjoining cylindrical surface on a machine part such as a rod or cylinder by associated parts of the seal assembly which cooperate to deflect the diaphragm axially relative to the body. The regulation of the break-out force vs. pressure is obtained by the area and orientation of surfaces on the diaphragm margin exposed to fluid pressure.

Another feature of this invention is that the diaphragm, in addition to having the primary sealing edge which engages the adjoining cylindrical surface (and which is ordinarily a dynamic sealing edge), also is provided with a secondary or static sealing edge to prevent leakage of fluid around the regions of the annular sealing ring remote from the primary sealing edge. This eliminates the need for auxiliary sealing devices such as metal O-rings and the like in the seal assembly.

Still another feature of the invention provides for protecting the dynamic or primary sealing edge against damage by an accumulation of dust or other foreign matter.

Various preferred seal assemblies embodying the principles and features of this invention are shown in the accompanying drawings as examples of how this invention may be practiced:

FIG. 1 is an axial cross section of a preferred seal assembly particularly useful for reciprocating service and which provides a break-out force inversely proportional to the fluid pressure acting on the seal;

FIG. 2 is an enlarged portion of the seal assembly of FIG. 1 showing the sealing edge of the diaphragm in engagement with a reciprocating rod and the surrounding casing in which the rod operates;

FIG. 3 is an even further enlargement of the same region of FIGURE 1, and includes a force diagram demonstrating why the inverse break-out force-fluid pressure relationship exists with this assembly;

FIG. 4 is a fragmentary axial cross section of another seal assembly having a different form of secondary or static sealing edge acting on the diaphragm than that used in FIG. 1;

Figure 6:
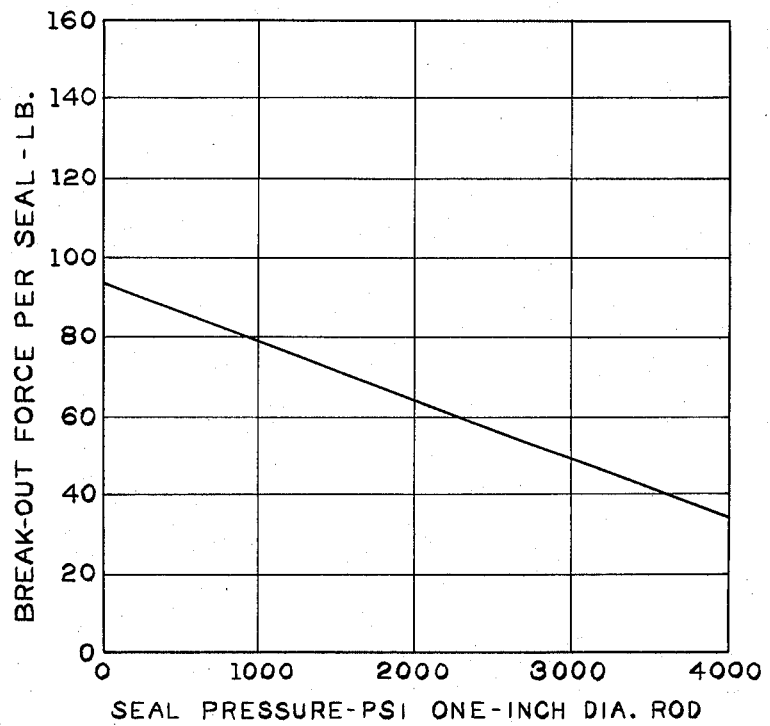
FIG. 6 is a graph showing the break-out force vs. fluid pressure for a typical seal made according to FIGS. 1–3.

Referring to FIG. 1, a seal assembly 10 is in sealing engagement with a rod 11 along a cylindrical surface region 12 of the rod which projects through an open end of a surrounding casing 13. Fluid pressure inside casing 13 acts against the seal assembly 10 and is prevented by the seal from leaking between the rod 11 and the open end of the casing.

The major elements of seal assembly 10 include an annular metallic sealing ring 15, an adjusting sleeve 17, and a loading nut 18. All these parts are annular and are nested together coaxially of each other and concentric with rod 11.

The sealing ring 15 has a stiff annular body 19 with a sealing diaphragm 20 at one end turned inwardly toward rod 11. The internal diameter of the body 19 is much larger than rod 11 and is internally threaded at 19a to receive the adjusting sleeve 17 in threaded engagement.

Diaphragm 20 terminates in a narrow circumferentially continuous sealing edge 21 (see FIGS. 2–3) which is preferably shaped in the form of a cylinder several thousandths of an inch (e.g. 0.005 inch) in its axial extent. Sealing edge 21 may be rounded, however, or it may be quite sharp; all these forms being included under the general term "knife edge" sometimes used in this description with reference to sealing edge 21 in that they are adapted to make a substantially line contact with the rod 11 when the seal assembly is complete.

Diaphragm 20 is of generally shallow conical shape in the sense that its sealing edge 21 is both radially and axially offset from an annular zone 23 of the diaphragm where it is joined to the body 19 of the sealing ring. The diaphragm is "shallow" in the sense that in its free, undeflected state, the radial extent of the diaphragm from its junction at zone 23 to its sealing edge 21 (relative to the axis of the assembly) appreciably exceeds the extent to which edge 21 and zone 23 are axially separated from each other.

Adjacent to its sealing edge 21, diaphragm 20 is of maximum thickness and becomes progressively thinner toward the zone 23 at its junction with the body. The thick annular marginal region 25 adjoining edge 21 advantageously provides hoop strength for reinforcing edge 21 when the diaphragm is axially deflected as hereinafter described. Also, the thick annular margin 25 serves as a "heat sink" in that it serves to conduct heat rapidly away from the thin edge 21 as such heat is generated by reciprocating the rod 11 through the seal assembly. The diaphragm 20 tends to deflect along its thin zone 23 when the diaphragm is moved axially relative to body 19 during installation.

The annular sealing edge 21 of diaphragm 20 is the primary or dynamic sealing edge of sealing ring 15. In addition, diaphragm 20 includes a secondary knife sealing edge 26 on the thick marginal region 25 (FIGS. 1–3). In the FIG. 1 assembly, the body 19 of sealing ring 15 fits slidably inside a counterbore 27 at the mouth of casing 13 and is held inside this counterbore by loading nut 18 which bears against the rearward or rightward face of body 19. The force exerted on body 19 by nut 18 as it is tightened presses the secondary annular sealing edge 26 tightly into sealing engagement with a plane sealing face 29 of an annular shoulder 30 of casing 13 at the bottom of counterbore 27. The pressure engagement between sealing edge 26 and face 29 is sufficient to form a static seal to prevent leakage between fluid from the interior of casing 13 into the region of counterbore 27 which receives the body 19 of the ring. Concurrently, the primary sealing edge 21 tightly engages rod 12 along line 21a of FIG. 1 to prevent leakage between body 19 on sleeve 17 and rod 11. Both edges 21 and 26 effect substantially line-contact sealing engagement with the surfaces of the parts they engage.

The adjusting sleeve 17 is a thin rigid cylinder with an external thread 31 engageable with thread 19a inside body 19 of the sealing ring 15. In the final assembly as in FIG. 1, sleeve 17 is threaded through body 19 of the sealing ring 15 and its forward blunt edge 32 is pressed tightly against margin 25 of the diaphragm opposite the sealing edge 26. The bore of adjusting sleeve 17 has slidable clearance on rod 11, and the sleeve is axially longer than the body 19 so that the sleeve extends through and beyond the loading nut 18 for readjustment as hereinafter explained while the seal is in service.

The loading nut 18 has an internal thread 33 for engaging a corresponding external thread 33a on the outside end of casing 13, and also an open centered head 34 which is adapted to radially overlap and bear on the body 19 of the sealing edge. As the loading nut 18 is threaded onto its housing thread 33, its head portion 34 urges the body 19 of the sealing ring progressively deeper into the counterbore 27 to press static sealing edge 26 against the bottom surface 29 of the counterbore.

The annular sealing edge 21 may be made so that when diaphragm 20 is in its free undeflected state, the annular diameter of edge 21 is slightly greater than the diameter of surface 12 of rod 11. In this event, the seal is preferably assembled according to the procedure described in my pending U.S. application Serial No. 424,678. This procedure involves assembling the sealing ring around rod 11 in counterbore 27, and deflecting the diaphragm 20 axially toward body 20 by tightening loading nut 18 until a particular break-out force is reached between the rod 11 and the sealing edge 21. As a result of the deflection of the diaphragm, the sealing edge 21 is circumferentially constricted until it is in tight sealing engagement with rod 11. Thereafter the adjusting sleeve 17 is tightened against margin 25 of diaphragm 20 to hold the diaphragm firmly against face 29 and to prevent the diaphragm from chattering when rod 11 is reciprocated.

Alternatively, sealing edge 21 may be made so that its annular diameter is slightly smaller than the diameter of rod 11 when the diaphragm is in its free undeflected state. This latter procedure involves deflecting the diaphragm 20 axially away from body 19 by tightening adjusting sleeve 17 against the diaphragm to stretch the annular edge 21 circumferentially to a diameter such that the edge can be slipped over rod 11. After this assembly, the sleeve 17 is re-adjusted by screwing it slightly away from the diaphragm to permit the sealing edge 21 to resiliently contract until it is in gripping engagement with rod 11. Thereafter loading nut 14 is tightened to press the assembly of body 19 and sleeve 17 firmly against the bottom of counterbore 27 until the desired sealing load is established between sealing edge 26 and face 29.

For adjusting the axial position of sleeve 17 in the assembly, its outer end is preferably slotted as at 35 so that the sleeve can be engaged by a spanner wrench or other appropriate tool.

It is to be appreciated that the distortion imposed on the sealing edge 21 to effect its sealing engagement with rod 11 by either of the foregoing methods of assembly is very small and is well within the elastic limit of the metal used in the seals. However small, the distortion is sufficient to effect the desired intense sealing loads with remarkable accuracy. Moreover, the seal assembly may be adjusted progressively to compensate for wear on sealing edge 21, and the assembly may be repeatedly assembled and re-assembled without damage.

I have found that the relationship between the break-out force and the system fluid pressure in these seal assemblies is controlled primarily by the area and the orientation of the annular face 40 (see FIG. 3) of the diaphragm margin 25. This face 40 is the area of the diaphragm margin exposed to the fluid pressure of the system, and more particularly it is the area of the diaphragm margin lying between the primary sealing edge 21 which engages rod 11 and the secondary sealing edge 26 engaging face 29.

The force diagram of FIG. 3 shows how face 40 of the diaphragm reacts to changes in the system pressure to vary the break-out force. When the assembly is installed by either procedure previously described the initial mechanical adjustments of nut 18 and sleeve 17 establish determinant static loads on the sealing edges 21 and 26. Regardless of which assembly procedure is used, the initial edge loads can be carefully regulated with these seals, and the criterion for this adjustment is that the initial unit load at these edges shall always remain at least as high as or higher than the maximum pressure of the fluid in the system acting on these edges while the seal is in service, assuming reasonably smooth (but not highly polished) mating surfaces engaged with edges 21 and 26. As long as the fluid pressure acting on the seal is zero or near zero, the system fluid will not exert any measurable effect on the sealing loads at edges 21 and 26, and the initial static loads on edges 21 and 26 will be more than adequate to prevent fluid leakage. Additionally, from the geometry of the parts it can be seen that the break-out force at zero or near zero pressure is solely a function of the initial unit load exerted by sealing edge 21 radially against rod 11.

As the pressure of the fluid medium in the system is increased, the fluid pressure (represented by small vectors P in FIG. 3) will act on face 40 of the diaphragm margin 25 with a force represented by vector P of FIG. 3 which is normal to face 40. The horizontal or axial component L of such force P acts to urge the diaphragm 20 toward body 19, but no actual deflection occurs because the diaphragm is restrained by the tight abutting engagement of the forward blunt end 32 of sleeve 17 with diaphragm margin 25. Accordingly the initial mechanical load between static sealing edge 26 and its face 29 remains essentially unchanged regardless of the level of pressure of the fluid system and, moreover, component L has no effect on the break-out force.

The vertical or radial component R of the pressure force P, however, directly affects the break-out force. Component R acts radially on edge 21 in a manner tending to circumferentially expand the annular edge 21 and thereby relieve some of the initial mechanical load. This component R may even tend to slightly deflect the thin zone 23 of the diaphragm 20 as suggested by the dotted lines in FIG. 3. The seal assembly will be designed so that when effect is given to the action of component R, the resultant unit load at edge 21 will still remain higher than fluid pressure of the system, however.

It may be noted in FIG. 3 that the magnitude of force components L and R will depend on the area of surface 40 and also on the angle A at which face 40 is presented to the fluid pressure. Angle A is the angle between the face 40 and the axis of the assembly. By decreasing angle A, component R is increased whereas component L is decreased. Therefore, by making angle A smaller, the seal assembly becomes more sensitive to changes in pressure to vary the break-out force of rod 11. By applying these principles a designer has a very wide latitude in determining the particular pressure-break-out force characteristic he desires for a given hydraulic mechanism.

The sizes of the parts and suggested deflection effects in FIG. 3 are, of course, grossly exaggerated for illustration. The actual deflections will be very small.

A rod seal assembly having the configuration and proportions as shown in FIG. 3 has been tested to evaluate the foregoing principles. FIG. 6 is a chart showing the results which were measured in these tests. At zero fluid pressure on the seal, a break-out force of about 95 pounds was required to move a one-inch diameter rod corresponding to rod 11. A force of about 35 pounds was needed when the system pressure was increased to 4000 pounds per square inch.

FIG. 4 shows a partial seal assembly in which a static sealing edge 45 is located on a shoulder 46 of casing 47 to engage a plane sealing surface 48 on the thick annular diaphragm margin 49 of a sealing ring 50. The diaphragm margin has a dynamic sealing edge 51 engaged with a rod 52. The assembly also includes an adjusting sleeve 53 like that of FIG. 1 and a loading nut (not shown). This construction is slightly more difficult to machine than the FIG. 1 assembly because of the necessity for machining sealing edge 45 inside the casing 13. The figure demonstrates, however, that the static sealing edge 45 may be provided directly on the casing shoulder if desired, rather than on the diaphragm margin of the sealing ring as in the FIG. 1 assembly.

Figure 5:
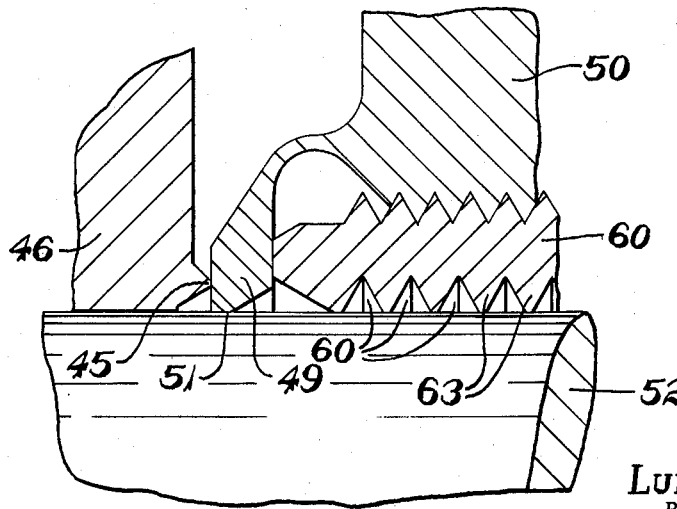
FIG. 5 is a view similar to FIG. 4 but which shows a means for minimizing the accumulation of foreign matter and dust on the dynamic sealing edge of the seal assembly.

FIG. 5 shows an assembly like FIG. 4 except that the bore of an adjusting sleeve 60 has a series of annular closely spaced grooves 62 in it which form a series of ridges 63 which are presented to the adjoining cylindrical surface of rod 52. The tips of ridges 63 have a slight slidable clearance with rod 52 as the latter is reciprocated, and function to "wipe" dust, dirt, lint, grease and other foreign matter on the rod into the grooves 62 when the rod is moved axially leftward as shown in this view. Accordingly the ridges 63 and grooves 62 prevent transfer to the dynamic sealing edge 51 of the seal of a major proportion of such foreign material which might otherwise become lodged under edge 51 to damage it.

Many variations of the assemblies described may be made within the scope of the appended claims.

What is claimed is:

1. A seal assembly comprising inner and outer relatively reciprocative members, an annular rigid sealing ring between the members, said sealing ring having a stiff annular body and a stiff annular sealing diaphragm integral therewith which is resiliently deflectable axially of said body, means for engaging a region of said diaphragm in static sealing contact with a region of one said member, a primary sealing edge on said diaphragm, means for maintaining said diaphragm deflected axially relative to said body to vary the circumference of said sealing edge and thereby maintain said sealing edge in forcible sealing sliding engagement with the other of said members, and a surface on said diaphragm extending between said primary sealing edge and said statically engaged region of said diaphragm which surface is responsive to an increase in the pressure of a fluid medium acting on said seal assembly to decrease the intensity of the sealing engagement of said primary sealing edge with said other member.

2. A seal assembly according to claim 1 wherein said region of said diaphragm engaged with said ring-mounting member is a knife-like sealing edge, and said primary sealing edge is also a knife-like sealing edge.

3. A metallic sealing ring comprising a stiff annular body and a stiff annular sealing diaphragm integral therewith which is resiliently deflectable axially of said body, means on said body for receiving an independent part for controlling deflection of said diaphragm, said diaphragm having a primary sealing edge thereon which can be varied in circumference in response to axial deflection of the diaphragm relative to said body, a secondary sealing region on said diaphragm radially offset from said primary sealing edge, and a fluid pressure responsive surface between said primary sealing edge and said secondary sealing region adapted to be presented to a fluid pressure medium acting on the sealing ring to vary the circumference of said primary sealing edge opposite to the change in circumference resulting from said axial deflection of said diaphragm.

4. A metallic sealing ring comprising a stiff annular body with a stiff annular sealing diaphragm integral therewith which is resiliently deflectable axially of said body, means on said body for engaging an independent part with said body for controlling deflection of said diaphragm, a primary sealing edge at the periphery of said diaphragm which can be varied in circumference in response to axial deflection of the diaphragm relative to said body, a secondary sealing edge near to the periphery of said diaphragm but radially offset from said primary edge, and a surface on said diaphragm between said primary and secondary edges adapted to be presented to a fluid pressure medium acting on the sealing ring to vary the circumference of said primary sealing edge opposite to the change in circumference resulting from the axial deflection of said diaphragm.

5. A metallic sealing ring according to claim 4 wherein said primary and secondary sealing edges are formed on a thick annular marginal region of said diaphragm and wherein said diaphragm is joined to said body along a much thinner annular deflectable zone.

6. A seal assembly comprising a part having an annular surface, and an annular metallic sealing ring having a stiff annular body and a stiff annular sealing diaphragm integral therewith, and said diaphragm terminating in an annular sealing edge, said diaphragm being resiliently deflectable axially relative to said body to engage said sealing edge with said annular surface, means for deflecting said diaphragm to engage said sealing edge in sliding sealing engagement with said annular surface of said part thereby imposing a motion-restraining force on said part during said relative movement between said part and said sealing edge and preventing the passage of a fluid pressure medium therebetween, and means on said diaphragm responsive to the resultant force of the pressure of said fluid medium acting on said diaphragm for decreasing the motion-restraining force imposed on said part as said pressure of the fluid medium increases.

7. A seal assembly according to claim 6 wherein said part is a rod mounted for reciprocation and which is concentrically encircled by said sealing ring.

8. A seal assembly according to claim 6 wherein said diaphragm is axially deflectable to vary the circumference of said sealing edge to bring said edge into forcible sliding engagemetn with said annular surface, and wherein said pressure responsive means also operates to vary the circumference of said sealing edge to decrease the motion-restraining force imposed on said part.

9. A seal assembly comprising inner and outer relatively reciprocative members, an annular metallic sealing ring between said members, said sealing ring having a stiff annular body and a stiff annular sealing diaphragm integral therewith terminating in an annular sealing edge, said diaphragm being resiliently deflectable axially of said body to vary the circumference of said sealing edge, means for mounting said sealing ring on one of said members with said diaphragm axially deflected so that said sealing edge thereon forcibly slidably engages said other member to impose on said other member a motion-restraining force during said relative reciprocation of said members and to prevent the passage of a fluid pressure medium between said sealing edge and the member with which it is engaged, and a pressure-responsive surface on said diaphragm for varying the circumference of said sealing edge to decrease the motion-restraining force imposed on said member by said edge as the pressure of said fluid medium is increased.

10. A seal assembly according to claim 9 wherein one of said members has a cylindrical surface terminating in an annular surface transverse to said cylindrical surface for receiving said sealing ring, said sealing ring being mounted on the latter said member with said body concentric with said cylindrical surface and with said diaphragm abutting said transverse surface, means engaged with said body for maintaining said diaphragm in forcible static abutting engagement with said transverse surface, a loading nut engaged with the latter said one member and bearing against said body for maintaining said diaphragm in axially deflected condition relative to said body so that said sealing edge is in forcible sliding engagement with the other member, and wherein said pressure-responsive surface of said diaphragm extends between said sealing edge thereon and said region of the diaphragm which is in abutting engagement with said transverse surface.

11. A seal assembly comprising inner and outer relatively reciprocative members, an annular metallic sealing ring between said members, said sealing ring having a stiff annular body and a stiff annular sealing diaphragm integral therewith terminating in a primary annular sealing edge, said diaphragm being resiliently deflectable axially of said body to vary the circumference of said primary sealing edge, a secondary sealing edge on said diaphragm, a cylindrical surface on one of said members on which surface said annular body of the sealing ring is mounted, an annular surface on the same said member transverse to said cylindrical surface against which said secondary sealing edge on said diaphragm abuts, means for maintaining said diaphragm with said secondary sealing edge in forcible static sealing engagement with said transverse surface, means for maintaining said diaphragm in axially deflected condition relative to said body to thereby maintain said primary sealing edge of the diaphragm in forcible sliding sealing engagement with the other of said two members thereby imposing on the other of said two members a motion-restraining force during the relative reciprocation of said members and preventing the passage of a fluid pressure medium between said primary sealing edge and the member with which it is engaged, and a pressure-responsive surface on said diaphragm for varying the circumference of said primary-sealing edge to decrease the motion-restraining force imposed on said member by said primary sealing edge as the pressure of said fluid medium is increased.

12. A seal assembly according to claim 11 wherein said member mounting said sealing ring is a fluid pressure casing and wherein said member engaged by said primary sealing edge of said sealing ring is a rod adapted for reciprocation in said casing.

13. A seal assembly comprising a casing, a rod projecting from the casing for reciprocation in the casing, a counterbore at the mouth of the casing terminating in a shoulder having an annular surface disposed transversely to the longitudinal axis of the casing, an annular metallic sealing ring having a stiff annular body seated in said counterbore and having a stiff annular sealing diaphragm integral with said body and abutting said transverse surface in sealing engagement, said diaphragm being resiliently deflectable axially of said body and terminating in a primary annular sealing edge, a loading nut engaged with said casing and bearing against said annular body to maintain said diaphragm in axially deflected condition and abutting said transverse surface and with said primary annular sealing edge in forcible sliding sealing engagement with said rod, an adjusting sleeve surrounding said rod and in threaded engagement with said body of the sealing ring and cooperating with said loading nut to maintain said diaphragm in axially deflected condition and in sealing engagement with said transverse surface, and a surface on said diaphragm between said sealing edge and said region of the diaphragm abutting said transverse surface which surface on said diaphragm is directed toward the fluid pressure medium acting on said sealing ring and is responsive to an increase in the pressure of said medium to decrease the intensity of the forcible engagement of said sealing edge with said rod.

14. The seal assembly according to claim 13 wherein said adjusting sleeve has a series of ridges on its internal surface presented to said rod to wipe foreign matter from the rod as it reciprocates in said seal assembly.

15. A seal assembly comprising a rigid sealing element having a rigid body and a stiff resilient diaphragm with a sealing surface portion adapted for effecting sealing sliding engagement with another part which is movable relative to said sealing element, means for deflecting said diaphragm relative to the body for slidably engaging said sealing surface portion of the diaphragm with said other part to impose a motion-restraining force on said other part during said relative movement of said part and to prevent the passage of a fluid pressure medium between said diaphragm and said part during such movement, and another surface portion on said diaphragm oriented so that said diaphragm is adapted for further deflection in response to the resultant force of the pressure of said fluid medium acting on said other surface portion for decreasing the motion-restraining force imposed on said part as the pressure of said fluid medium increases.

References Cited by the Examiner

UNITED STATES PATENTS

| 1,711,995 | 5/1929 | Erickson | 277—112 X |
| 1,840,312 | 1/1932 | Dunmire | 277—110 |
| 3,003,795 | 10/1961 | Lyon | 285—212 |
| 3,047,300 | 7/1962 | Taylor et al. | 277—112 |

FOREIGN PATENTS 1,215,958 11/1959 France.

LAVERNE D. GEIGER, *Primary Examiner.*

SAMUEL ROTHBERG, *Examiner.*